US011780071B2

(12) United States Patent
Shimizu et al.

(10) Patent No.: US 11,780,071 B2
(45) Date of Patent: Oct. 10, 2023

(54) POWER TOOL

(71) Applicant: KOKI HOLDINGS CO., LTD., Tokyo (JP)

(72) Inventors: Yasutaka Shimizu, Hitachinaka (JP); Yoshikazu Yokoyama, Hitachinaka (JP); Naoki Tadokoro, Hitachinaka (JP); Ryosuke Nakano, Hitachinaka (JP)

(73) Assignee: KOKI HOLDINGS CO., LTD., Tokyo (JP)

(*) Notice: Subject to any disclaimer, the term of this patent is extended or adjusted under 35 U.S.C. 154(b) by 754 days.

(21) Appl. No.: 16/961,597

(22) PCT Filed: Nov. 30, 2018

(86) PCT No.: PCT/JP2018/044201
§ 371 (c)(1),
(2) Date: Jul. 10, 2020

(87) PCT Pub. No.: WO2019/138726
PCT Pub. Date: Jul. 18, 2019

(65) Prior Publication Data
US 2021/0187722 A1 Jun. 24, 2021

(30) Foreign Application Priority Data
Jan. 12, 2018 (JP) .................................. 2018-003874

(51) Int. Cl.
*B23D 51/16* (2006.01)
*B27B 19/04* (2006.01)
(Continued)

(52) U.S. Cl.
CPC ............ *B25F 5/006* (2013.01); *B23D 49/165* (2013.01); *B23D 51/16* (2013.01); *B27B 19/04* (2013.01); *B27B 19/09* (2013.01)

(58) Field of Classification Search
CPC ........ B23D 49/16; B23D 51/16; B27B 10/04; B27B 19/00
See application file for complete search history.

(56) References Cited

U.S. PATENT DOCUMENTS 6,317,988 B1* 11/2001 Tachibana .............. B23D 51/02
30/376
6,651,348 B1* 11/2003 Steinmann ............. B23D 51/16
30/500

(Continued)

FOREIGN PATENT DOCUMENTS

CN 201841318 A 5/2011
CN 205290878 U 6/2016
(Continued)

OTHER PUBLICATIONS

International Preliminary Report on Patentability dated Jul. 14, 2020 by the International Bureau in PCT Application PCT/JP2018/044201 (English Translation of the IPRP).

(Continued)

*Primary Examiner* — Nathaniel C Chukwurah
(74) *Attorney, Agent, or Firm* — NovoTechIP International PLLC

(57) ABSTRACT

There is provided a power tool in which impact applied to a power transmission portion can be mitigated to thereby suppress components constituting the power transmission portion from being deformed and damaged. The power tool includes a brushless motor 3 having a rotation shaft portion 31 rotatable about a rotation axis A1, a housing 2 accommodating therein the brushless motor 3, a power transmission portion 6 configured to receive a rotation force of the rotation shaft portion 31 and to transmit a driving force based on the rotation force, and a driven portion 7 configured to be driven by receiving the transmitted driving force. The rotation shaft portion 31 is supported by the housing 2

(Continued)

so as to be movable relative to the housing 2 in an axial direction of the rotation axis A1.

10 Claims, 7 Drawing Sheets

(51) Int. Cl.
    *B25F 5/00*           (2006.01)
    *B23D 49/16*        (2006.01)
    *B27B 19/09*        (2006.01)

(56) References Cited

U.S. PATENT DOCUMENTS

| | | | |
|---|---|---|---|
| 9,724,771 B2* | 8/2017 | Aoki | B23D 51/16 |
| 2004/0255475 A1* | 12/2004 | Hirabayashi | B23D 51/16 30/392 |
| 2005/0022395 A1* | 2/2005 | Hirabayashi | B23D 51/16 30/392 |
| 2006/0117581 A1 | 6/2006 | Oki et al. | |
| 2009/0113728 A1 | 5/2009 | Oki et al. | |
| 2014/0208600 A1 | 7/2014 | Moreno et al. | |
| 2015/0375315 A1 | 12/2015 | Ukai et al. | |

FOREIGN PATENT DOCUMENTS

| | | |
|---|---|---|
| CN | 105945353 A | 9/2016 |
| CN | 205986472 U | 2/2017 |
| CN | 107457414 A | 12/2017 |
| EP | 1878550 A1 | 1/2008 |
| JP | S63-64427 U | 4/1988 |
| JP | S63-176024 U | 11/1988 |
| JP | H02-22044 U | 2/1990 |
| JP | H04-35659 U | 3/1992 |
| JP | H11-333762 A | 12/1999 |
| JP | 2010-194697 A | 9/2010 |
| JP | 2013-180382 A | 9/2013 |
| WO | 2017142092 A1 | 8/2017 |

OTHER PUBLICATIONS

Extended European Search Report dated Oct. 13, 2021 in European Patent Application No. 1889510.4.
International Search Report and Written Opinion dated May 2, 2019 by the International Searching Authority (Japan Patent Office) in PCT Application PCT/JP2018/044201 (English Translation of the ISR).
Office Action dated Sep. 2, 2022 in Chinese Patent Application No. 201880086271.X.

* cited by examiner

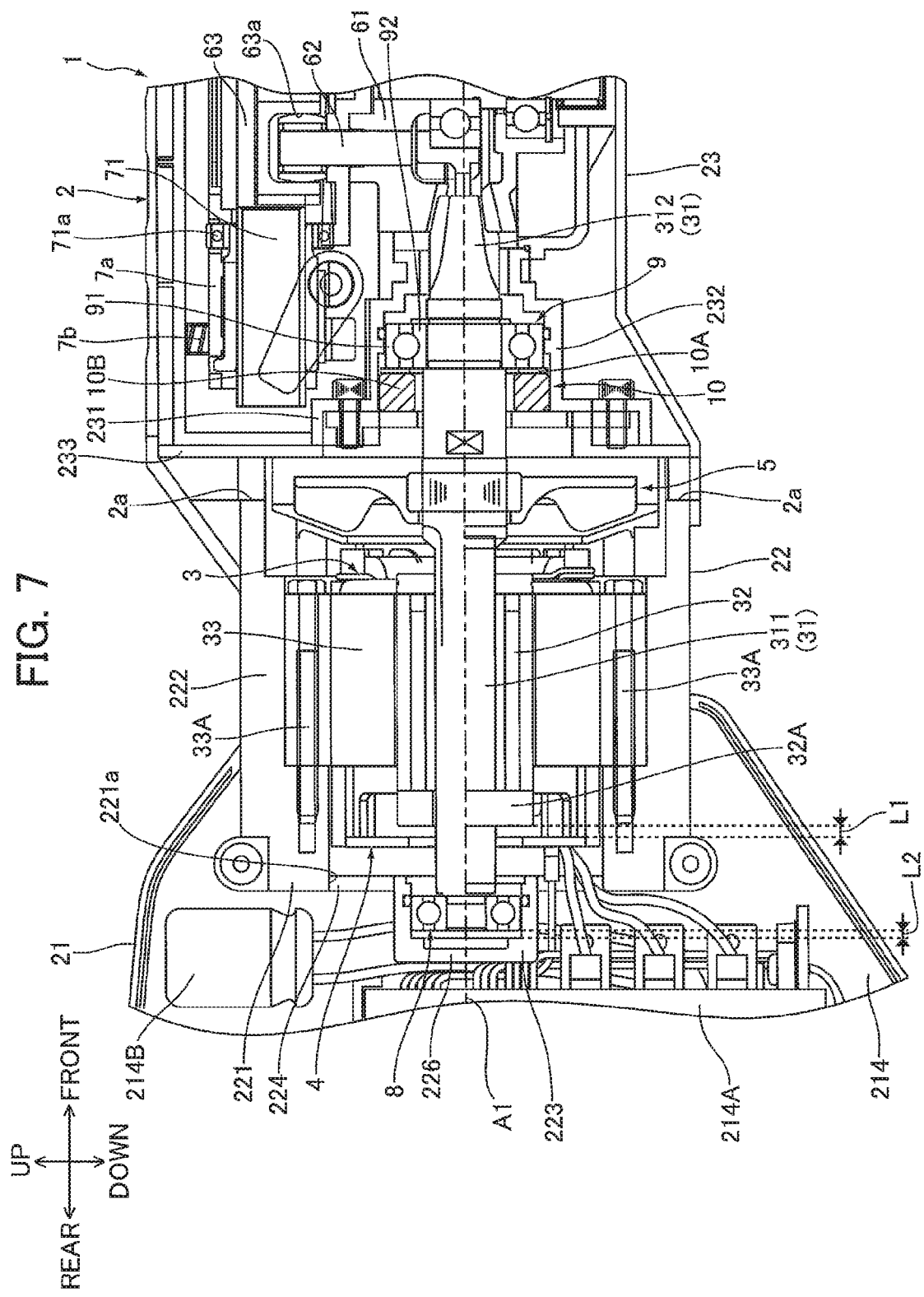

POWER TOOL

TECHNICAL FIELD

The present invention relates to a power tool

BACKGROUND ART

Conventionally, there has been known a power tool including a motor having a rotation shaft, a power transmission portion configured to receive rotational force of the rotation shaft and to transmit driving force based on the rotational force, and a driven portion configured to be driven by receiving the driving force. For example, a typical example of this kind of power tools is a saber saw (see Patent Literature 1) is used to cut a wood, steel, and a pipe (as a workpiece to be cut).

The saber saw described in Patent Literature 1 includes a motor having a rotation shaft, a motion converting portion (power transmission portion) configured to convert rotational force of the rotation shaft into reciprocating driving force and to transmit the reciprocating driving force, and a plunger (driven portion) configured to perform reciprocating movement by receiving the reciprocating driving force. A blade (saw blade) as an end bit is attachable to and detachable from the plunger. In the saber saw, the motor is driven to cause the plunger having the blade attached thereto to reciprocally move, and the workpiece is cut by the reciprocating blade.

CITATION LIST

Patent Literature

[PTL1] Japanese Patent Application Publication No. 2013-180382

SUMMARY OF INVENTION

Technical Problem

During cutting work using the above-described saber saw, the plunger having the blade attached thereto may be locked when the blade gets stuck in the workpiece. When this lock of the plunger occurs, a strong impact is applied from the blade (end bit) to the motion converting portion (power transmission portion) through the plunger (driven portion), which may lead to deformation or damage to components (such as gears) constituting the motion converting portion.

In view of the foregoing, it is an object of the present invention to provide a power tool in which the impact applied to the power transmission portion can be mitigated to thereby suppress the components constituting the power transmission portion from being deformed or damaged.

Solution to Problem

In order to attain the above object, the present invention provides a power tool including a motor having a rotation shaft portion rotatable about a rotation axis, a housing accommodating therein the motor, a power transmission portion configured to receive a rotation force of the rotation shaft portion and to transmit a driving force based on the rotation force, and a driven portion configured to be driven by receiving the transmitted driving force, the rotation shaft portion being supported by the housing so as to be movable relative to the housing in an axial direction of the rotation axis.

With this structure, an impact applied to the rotation shaft portion and the power transmission portion can be mitigated by the movement in the axial direction of the rotation shaft portion. Accordingly, the rotation shaft portion and the components constituting the power transmission portion can have improved durability against the impact, and thus the rotation shaft portion and the components constituting the power transmission portion can be suppressed from being deformed and damaged. Further, according to the above-described structure, the improvement on the durability of the rotation shaft portion and the components constituting the power transmission portion against the impact can be achieved at low cost and with a compact structure, in comparison with a structure in which a clutch mechanism or the like for mitigating the impact applied to the rotation shaft portion and the power transmission portion is provided on the power transmission path.

In the above-described structure, it is preferable that the power tool further includes a shock absorbing portion including an elastic body configured to be elastically deformed by movement of the rotation shaft portion in the axial direction.

With this structure, the impact applied to the rotation shaft portion and the power transmission portion can further be effectively mitigated by virtue of the elastic deformation of the elastic body.

In the above-described structure, it is preferable: that the power tool further includes a bearing supporting the rotation shaft portion such that the rotation shaft portion is rotatable about the rotation axis; that the bearing is supported by the housing so as to be movable integrally with the rotation shaft portion in the axial direction; that the shock absorbing portion and the bearing are arrayed in the axial direction; and that the shock absorbing portion is in contact with the bearing.

This structure can effectively mitigate the impact applied to the rotation shaft portion and the power transmission portion.

In the above-described structure, it is preferable: that the shock absorbing portion further includes a plate interposed between the bearing and the elastic body; that the bearing includes an outer race and an inner race which are rotatable relative to each other; that the rotation shaft portion is fixed to the inner race; that the elastic body urges the plate toward the outer race; and that the plate is in contact with the outer race and is away from the inner race.

With this structure, since the plate is positioned between the elastic body and the bearing, the elastic body expanded at the time of compression never contacts with the inner race of the bearing. Hence, smooth relative rotation between the inner race and the outer race can be ensured even during the compression of the elastic body.

In the above-described structure, it is preferable: that the power tool includes a second bearing supported by the housing and supporting, in cooperation with the bearing, the rotation shaft portion such that the rotation shaft portion is rotatable about the rotation axis; and that the elastic body is positioned between the bearing and the second bearing in the axial direction.

With this structure, a space between conventional two bearings used to support a rotation shaft portion can be effectively utilized, whereby an increase in size of the power tool can be suppressed.

In the above-described structure, it is preferable: that the rotation shaft portion includes a rotation shaft extending in the axial direction, and a gear provided at the rotation shaft; and that the power transmission portion includes a bevel gear in meshing engagement with the gear.

With this structure, the impact applied to the power transmission portion can be efficiently converted into an impact applied to the rotation shaft in the axial direction (i.e., into a thrust force applied to the rotation shaft). Hence, the impact directed in the axial direction can be effectively mitigated by the movement in the axial direction of the rotation shaft. Accordingly, the impact applied to the rotation shaft portion and the power transmission portion can further be effectively mitigated.

In the above-described structure, it is preferable: that the power tool includes a shaft reciprocally movable in the front-rear direction by the bevel gear; and that the elastic body is disposed at a position overlapping with a rear end of the shaft in the front-rear direction when the shaft is at a rearmost position.

In the above-described structure, it is preferable: that the power tool further includes an orbital mechanism configured to change inclination of the shaft according to a position in the front-rear direction of the shaft; and that the orbital mechanism include a sleeve portion support the shaft such that the shaft is slidably movable.

In the above-described structure, it is preferable that the elastic body is disposed at a position overlapping with a rear end of the sleeve portion in the front-rear direction.

In the above-described structure, it is preferable that the motor is a brushless motor.

With this structure, a structure in which the impact applied to the rotation shaft portion and the power transmission portion is mitigated by moving the rotation shaft portion in the axial direction, can be suitably achieved.

Advantageous Effects of Invention

According to the present invention, there can be provided a power tool in which the impact applied to the power transmission portion can be mitigated to thereby suppress the components constituting the power transmission portion from being deformed or damaged.

BRIEF DESCRIPTION OF DRAWINGS

FIG. 7 is a partial cross-sectional view illustrating the internal structure of the saber saw according to the embodiment, and particularly illustrating a state where the elastic body is compressed due to the occurrence of locking of a driven portion.

DESCRIPTION OF EMBODIMENTS

Figure 1:
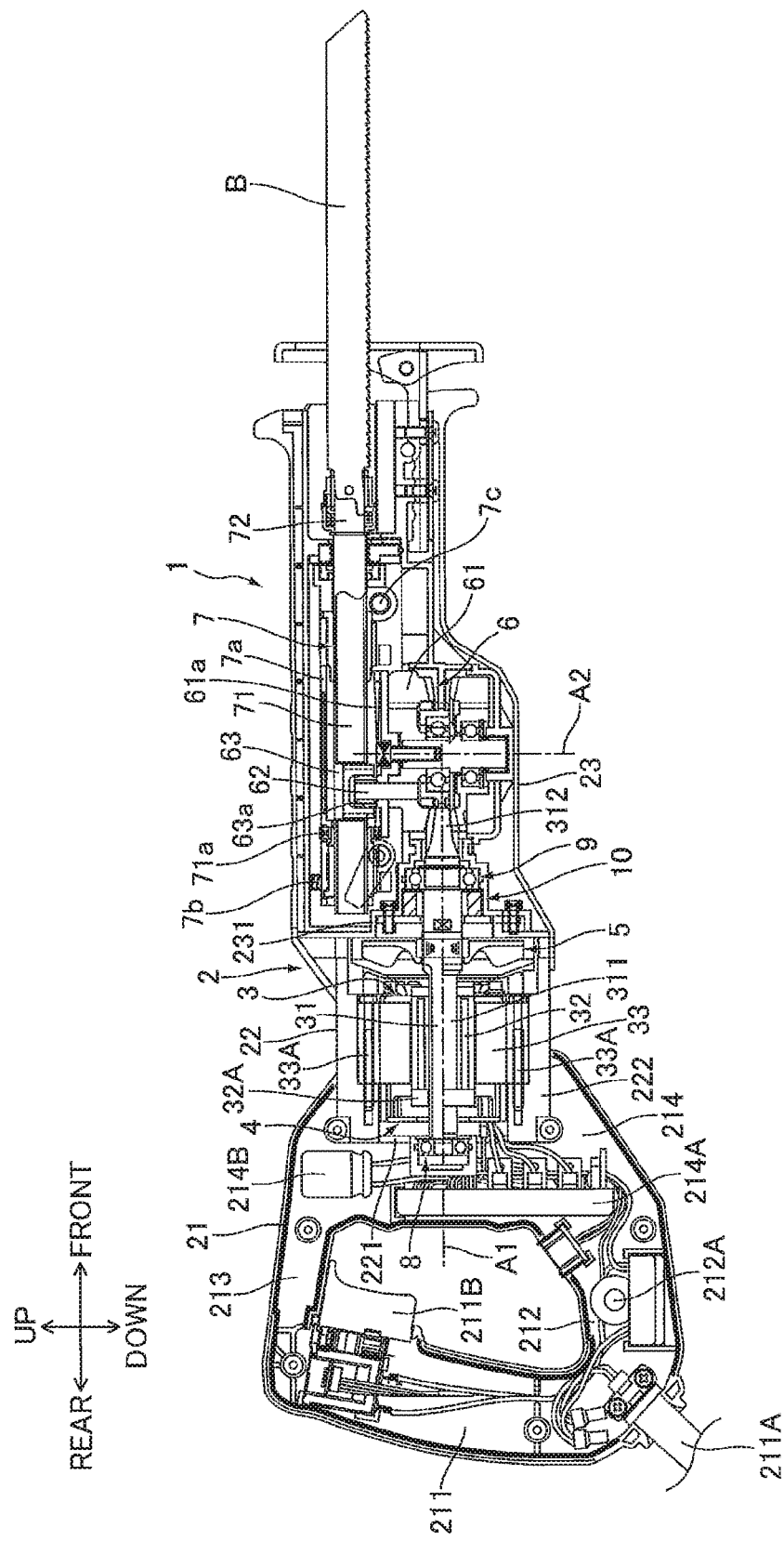
FIG. 1 is a cross-sectional view illustrating an internal structure of a saber saw according to an embodiment of the present invention.

Hereinafter, a power tool according to one embodiment of the present invention will be described with reference to FIGS. 1 through 7. In the following description, "up", "down", "front", "rear", "right", and "left" indicated by arrows in the drawings define the upward direction, downward direction, frontward direction, rearward direction, rightward direction, and leftward direction, respectively.

The saber saw 1 illustrated in FIG. 1 is an electrically powered reciprocating tool for cutting a workpiece to be cut such as a wood, a steel, or a pipe. As illustrated in FIG. 1, the saber saw 1 includes a housing 2, a brushless motor 3 having a rotation shaft portion 31, a sensor board 4, a fan 5, a power transmission portion 6, a driven portion 7 to which a blade B for cutting the workpiece to be cut is detachably attachable, a rear bearing 8, a front bearing 9, a shock absorbing portion 10, a power supply circuit (not illustrated), and a controller (not illustrated). In the saber saw 1, the brushless motor 3 is employed as a drive source, the driven portion 7 having the blade B attached is reciprocally moved by rotation of the brushless motor 3, and cutting work is performed using the reciprocating blade B.

The housing 2 constitutes the outer shell of the saber saw 1, and includes a handle housing 21, a motor case 22, and a gear case 23.

The handle housing 21 is made of resin, and constitutes the rear portion of the housing 2. The handle housing 21 is connected to a rear portion of the motor case 22, and supports the motor case 22. The handle housing 21 includes a grip portion 211, a first connecting portion 212, a second connecting portion 213, and a motor support portion 214.

The grip portion 211 is a portion that an operator can grip, and has a generally hollow cylindrical shape extending in the up-down direction. The grip portion 211 has a lower end portion from which a power cord 211A extends, the power cord being connectable to an external power source (for example, a commercial AC power source). The grip portion 211 has an upper portion provided with a trigger switch 211B which can be manually operated for controlling start and stop of the brushless motor 3.

The first connecting portion 212 connects the lower portion of the grip portion 211 and a rear lower portion of the motor support portion 214. The first connecting portion 212 accommodates therein a choke coil 212A and other components which constitute the power supply circuit. The second connecting portion 213 connects the upper portion of the grip portion 211 and a rear upper portion of the motor support portion 214.

The motor support portion 214 is positioned frontward of the grip portion 211. The motor support portion 214 is connected to the rear portion of the motor case 22 and supports the motor case 22. The motor support portion 214 includes a right wall and left wall. Each of the right wall and the left wall of the motor support portion 214 has a lower portion formed with a plurality of air inlet holes (not illustrated). Further, the motor support portion 214 accommodates therein a board accommodating portion 214A and a smoothing capacitor 214B which constitutes the power supply circuit.

The board accommodating portion 214A is a bottomed box shaped container opening frontward, and accommodates therein a circuit board on which the controller and a part of the power supply circuit are mounted. The power supply circuit is a circuit for supplying electric power of the external power source to the brushless motor 3 through the power cord 211A. The power supply circuit includes: a noise filter circuit including the choke coil 212A; a rectification smoothing circuit including the smoothing capacitor 214B; and an inverter circuit. The controller includes a microcomputer having a CPU, a ROM, and a RAM, and is configured to control the inverter circuit to perform rotation control (driving control) of the brushless motor 3.

Figure 2:
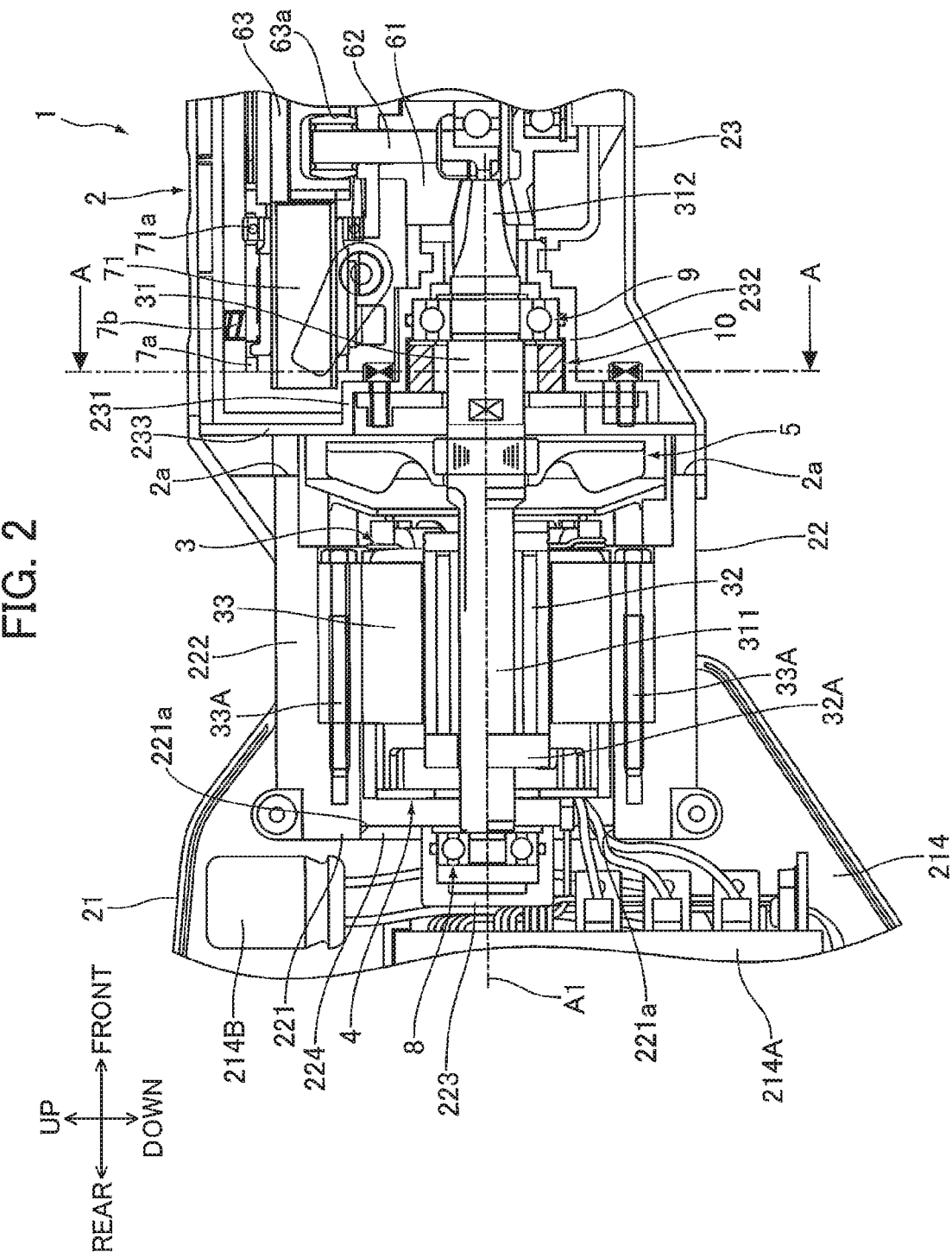
FIG. 2 is a partial cross-sectional view illustrating a brushless motor, a motor case, and a rear portion of a gear housing in the saber saw according to the embodiment.

The motor case 22 is a member which is integrally molded and made of resin. The motor case 22 has a bottomed hollow cylindrical shape extending in the front-rear direction and opening frontward. As illustrated in FIG. 2, the motor case 22 includes a rear wall portion 221 and a sleeve portion 222, and accommodates therein the brushless motor 3, the sensor board 4, and the fan 5.

The rear wall portion 221 constitutes the rear portion of the motor case 22, and includes a rear bearing support portion 223 and a connection wall 224. The rear bearing support portion 223 has a bottomed generally hollow cylindrical shape extending in the front-rear direction and opening frontward. The rear bearing support portion 223 supports the rear bearing 8. Details of the rear bearing support portion 223 and the rear bearing 8 will be described later.

The connection wall 224 extends outwardly in the radial direction of the rear bearing support portion 223 from the front end portion of the rear bearing support portion 223 (i.e., from the front end portion of a hollow cylindrical wall 223A described later). The connection wall 224 connects the front end portion of the rear bearing support portion 223 and the rear end portion of the sleeve portion 222. The connection wall 224 is formed with a plurality of communication holes 221a. The plurality of communication holes 221a penetrates the connection wall 224 in the front-rear direction and allows the interior of the motor case 22 to be communicated with the interior of the motor support portion 214 (the interior of the handle housing 21).

The sleeve portion 222 has a generally hollow cylindrical shape extending frontward from the peripheral end portion of the connection wall 224 of the rear wall portion 221. The sleeve portion 222 has a front open end closed by the gear case 23. The front end portion of the sleeve portion 222 is formed with a plurality of discharge holes 2a. The plurality of discharge holes 2a penetrates the sleeve portion 222 in the up-down direction and allows the interior of the motor case 22 to be communicated with the outside of the housing 2.

Turning back to FIG. 1, the gear case 23 is made of metal and connected to the front portion of the motor case 22, and extends in the front-rear direction. The gear case 23 accommodates therein the power transmission portion 6 and the driven portion 7, and includes a rear wall portion 231.

As illustrated in FIG. 2, the rear wall portion 231 constitutes the rear portion of the gear case 23, and closes the open end of the sleeve portion 222 of the motor case 22. The rear wall portion 231 includes a front bearing support portion 232 and a facing wall 233. The front bearing support portion 232 supports the front bearing 9 and the shock absorbing portion 10. Details of the front bearing support portion 232, the front bearing 9, and the shock absorbing portion 10 will be described later.

The facing wall 233 faces the sleeve portion 222 of the motor case 22 in the front-rear direction, and is connected to the rear end portion of the front bearing support portion 232 (i.e., the rear end portion of a connection wall 236 described later).

The brushless motor 3 is accommodated in the motor case 22, and includes the rotation shaft portion 31, a rotor 32, and a stator 33. The brushless motor 3 is a three-phase brushless DC motor, and is a drive source of the saber saw 1 (that is, a drive source for driving the driven portion 7). The brushless motor 3 is an example of a "motor" of the present invention.

The rotation shaft portion 31 is supported by the housing 2 (the motor case 22 and the gear case 23) through the rear bearing 8 and the front bearing 9 such that the rotation shaft portion 31 is rotatable about a rotation axis A1 extending in the front-rear direction and movable relative to the housing 2 in the front-rear direction (i.e., in the axial direction of the rotation axis A1). The rotation shaft portion 31 includes a rotation shaft 311 and a pinion gear 312. The rotation axis A1 is an example of a "rotation axis" in the present invention.

The rotation shaft 311 has a generally solid cylindrical shape extending in the front-rear direction. The rotation shaft 311 is supported by the rear bearing 8 and the front bearing 9 so as to be rotatable about the rotation axis A1. Specifically, the rear end portion of the rotation shaft 311 is supported by the rear bearing 8, and the front end portion of the rotation shaft 311 is supported by the front bearing 9. In the present embodiment, the rotation shaft 311 (the rotation shaft portion 31) is configured to rotate in the counterclockwise direction in a front view when the brushless motor 3 is driven.

The pinion gear 312 is a spiral bevel gear whose tooth trace is left-twisted. The pinion gear 312 is provided at the front end portion of the rotation shaft 311 integrally with the rotation shaft 311. The pinion gear 312 rotates integrally and coaxially with the rotation shaft 311. The pinion gear 312 is an example of a "gear" in the present invention.

The rotor 32 includes permanent magnets, and is fixed to the rotation shaft 311 so as to rotate coaxially and integrally with the rotation shaft 311. A sensor magnet 32A having an annular shape from a rear view is provided at the rear end of the rotor 32 so as to rotate coaxially and integrally with the rotor 32.

The stator 33 has a generally hollow cylindrical shape extending in the front-rear direction, and includes three star-connected stator coils. Each of the upper and lower portions of the outer peripheral portion of the stator 33 is fixed to the motor case 22 by a bolt 33A. Hence, the stator 33 is fixed to the housing 2 in a state where the stator 33 is accommodated in the motor case 22.

The sensor board 4 has an annular shape in a front view, and is provided rearward of the stator 33. Three Hall elements (not illustrated) are mounted on the sensor board 4 for detecting the rotational position of the sensor magnet 32A (i.e., the rotational position of the rotor 32).

The three Hall elements are mounted on the front surface of the sensor board 4, and are disposed to be arrayed at approximately 60 degrees of intervals in the circumferential direction of the rotation shaft 311. Each of the three Hall elements is connected to the controller through a signal wire, and is configured to output, to the controller, signals used for detecting the rotational position of the sensor magnet 32A. Note that, the controller detects the rotational position of the rotor 32 by detecting the rotational position of the sensor magnet 32A on the basis of signals outputted from each of the three Hall elements, and controls the inverter circuit on the basis of the detection results to rotate the rotor 32 and the rotation shaft portion 31 in a predetermined rotational direction.

The fan 5 is a centrifugal fan, and is positioned frontward of the stator 33 of the brushless motor 3. The fan 5 is fixed to the rotation shaft 311 so as to rotate integrally and coaxially with the rotation shaft 311. The fan 5 is configured to generate cooling air flows that flow in the housing 2 from the plurality of inlet holes to the plurality of exhaust holes 2a. The cooling air flows cool the brushless motor 3, the inverter circuit, the rectification circuit, and other components.

As illustrated in FIG. 1, the power transmission portion 6 includes a power transmission gear 61, a pin 62, and a pin guide 63. The power transmission portion 6 is a mechanism configured to receive the rotational force of the rotation shaft portion 31 (i.e., the rotation shaft 311) and transmit the driving force based on the rotational force to the driven portion 7. Specifically, the power transmission portion 6 converts rotation of the rotation shaft portion 31 into reciprocating motion in the front-rear direction, and transmit the reciprocating motion to the driven portion 7.

The power transmission gear 61 is a spiral bevel gear whose tooth trace is right-twisted, and is disposed at a lower portion of the interior of the gear case 32 and frontward of the front bearing support portion 232. The power transmission gear 61 is supported by the gear case 23 so as to be rotatable about a rotation axis A2 extending perpendicular to the rotation axis A1 (that is, extending in the up-down direction). The power transmission gear 61 is in meshing engagement with the pinion gear 312. As described above, according to the present embodiment, the power transmission gear 61 is the spiral gear whose tooth trace is right-twisted, and the pinion gear 312 in meshing engagement with the power transmission gear 61 is the spiral gear whose tooth trace is left-twisted. Further, the rotation shaft portion 31 rotates in the counterclockwise direction in a front view when the brushless motor 3 is driven. Hence, during driving of the brushless motor 3 (during rotation of the rotation shaft portion 31), a slight thrust force directed rearward (i.e., directed in a direction away from the power transmission gear 61) is constantly imparted on the pinion gear 312. The power transmission gear 61 is an example of a "bevel gear" in the present invention.

The pin 62 has a generally solid cylindrical shape extending in the up-down direction. The pin 62 is fixed to the power transmission gear 61 by force-fitting, and is positioned away from the rotation axis A2 in a plan view. The upper portion of the pin 62 protrudes upward from the upper surface of the power transmission gear 61.

The pin guide 63 has a generally rectangular parallelepiped shape extending in the left-right direction and is movable in the front-rear direction within the gear case 23. The pin guide 63 is formed with a pin receiving groove 63a.

The pin receiving groove 63a is recessed upward from the lower surface of the pin guide 63, and extends in the left-right direction. The pin receiving groove 63a has a width in the front-rear direction that is slightly greater than a diameter of the pin 62. The upper end portion of the pin 62 is accommodated in the pin receiving groove 63a via a needle bearing. Hence, relative movement in the front-rear direction between the pin guide 63 and the pin 62 is prevented, while relative movement in the left-right movement therebetween is permitted.

The driven portion 7 is supported by the gear case 23 so as to be reciprocally movable in the front-rear direction within the gear case 23. The driven portion 7 is positioned at the opposite side of the motor support portion 214 from the grip portion 211 in the front-rear direction. The driven portion 7 includes a sleeve portion 7a extending the front-rear direction, a shaft 71 supported by the sleeve portion 7a so as to be slidably movable, and a blade attachment portion 72.

The shaft 71 has a hollow cylindrical shape extending in the front-rear direction. The shaft 71 is supported by the gear case 23 through the sleeve portion 7a so as to be reciprocally movable in the front-rear direction. The shaft 71 is fixed to the pin guide 63 so as to reciprocally move in the front-rear direction together with the pin guide 63. Note that, FIG. 1 illustrates a state where the shaft 71 is positioned at the rearmost position within a reciprocally movable range of the shaft 71 (i.e., a state where the shaft 71 is at the rear dead center).

The blade attachment portion 72 is provided at the front end portion of the shaft 71. The blade B is attachable to and detachable from the blade attachment portion 72.

Next, the rear bearing support portion 223, the rear bearing 8, the front bearing support portion 232, the front bearing 9, and the shock absorbing portion 10 will be described in detail while referring to FIGS. 3 to 5. In the following description, the circumferential direction of the rotation shaft 311 will be referred to simply as the "circumferential direction", and the radial direction of the rotation shaft 311 will be referred to simply as the "radial direction".

Figure 3:
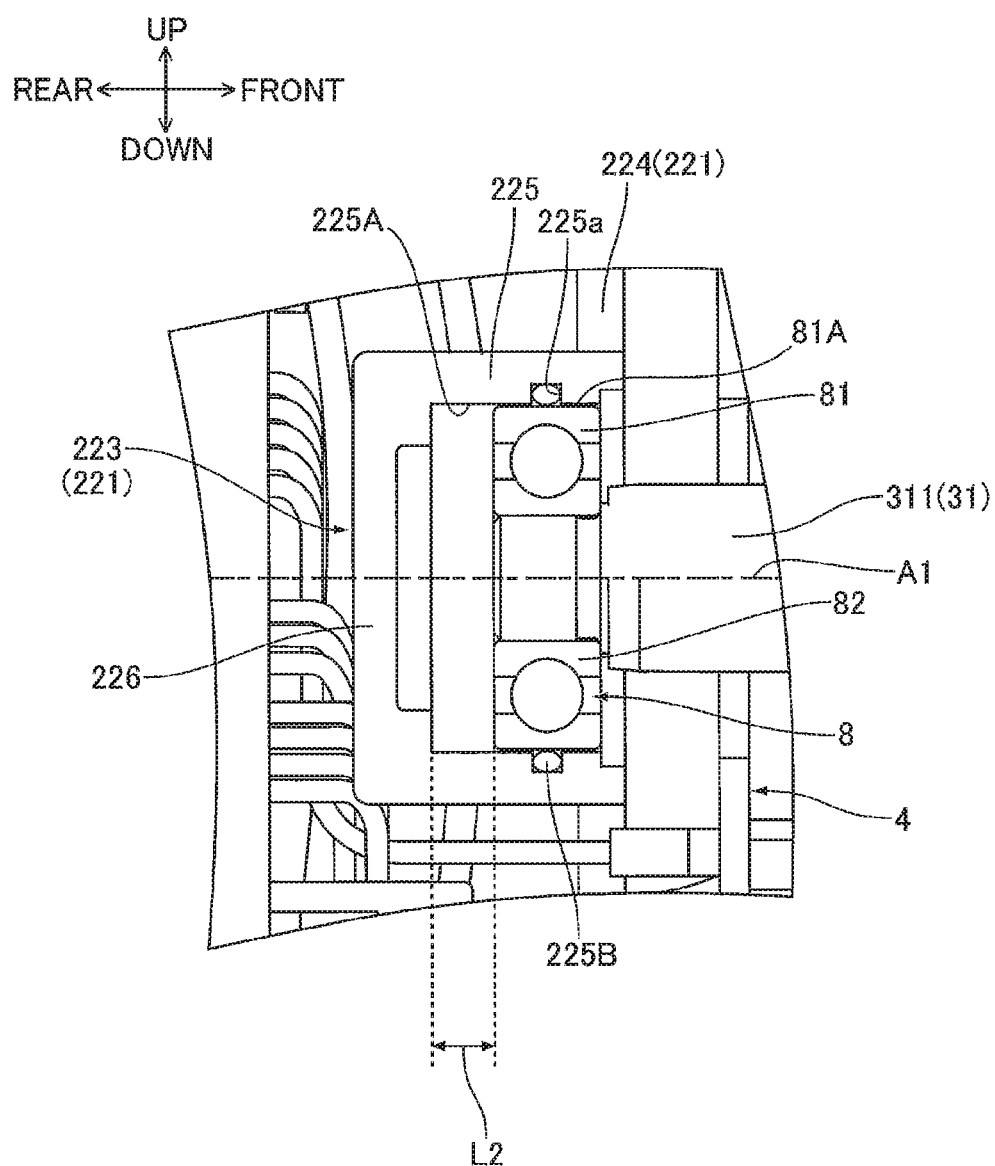
FIG. 3 is an enlarged partial cross-sectional view illustrating a rear bearing support portion and a rear bearing in the saber saw according to the embodiment.

As illustrated in FIG. 3, the rear bearing support portion 223 supports the rear bearing 8 such that the rear bearing 8 is movable in the front-rear direction. The rear bearing support portion 223 includes a sleeve wall 225 and a rear end wall 226. The sleeve wall 225 has a generally hollow cylindrical shape extending in the front-rear direction. The sleeve wall 225 is formed with a groove 225a.

The groove 225a is recessed outwardly in the radial direction from an inner peripheral surface 225A of the sleeve wall 225, and extends over the entirety thereof in the circumferential direction. An O ring 225B is fitted in the groove 225a. The rear end wall 226 closes the rear open end of the sleeve wall 225, and has a generally circular shape in a rear view.

The rear bearing 8 is a ball bearing including an outer race 81 and an inner race 82, which are rotatable relative to each other. The rear bearing 8 is force-fitted in the sleeve wall 225 through the O ring 225B, and a minute gap is provided between the inner peripheral surface 225A of the sleeve wall 225 and an outer peripheral surface 81A of the outer race 81. Hence, the rear bearing 8 is movable relative to the rear bearing support portion 223 in the front-rear direction. The rear end portion of the rotation shaft 311 is force-fitted in and fixed to the inner race 82 of the rear bearing 8 and accordingly, the rotation shaft 311 (the rotation shaft portion 31) and the rear bearing 8 move integrally with each other in the front-rear direction. The rear bearing 8 is an example of a "second bearing" in the present invention.

Figure 4:
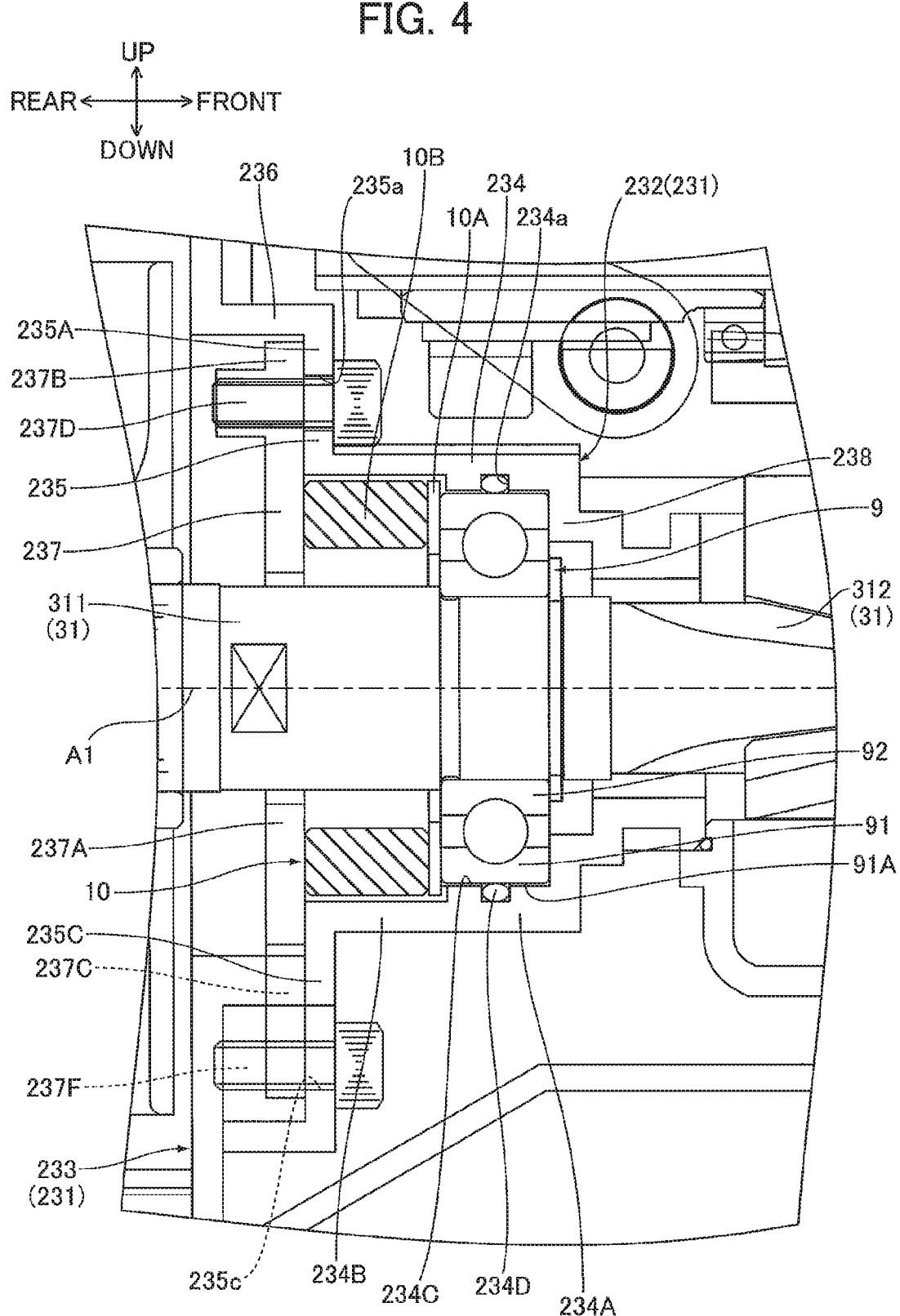
FIG. 4 is an enlarged partial cross-sectional view illustrating a front bearing support portion, a front bearing, and a shock absorbing portion in the saber saw according to the embodiment.
Figure 5:
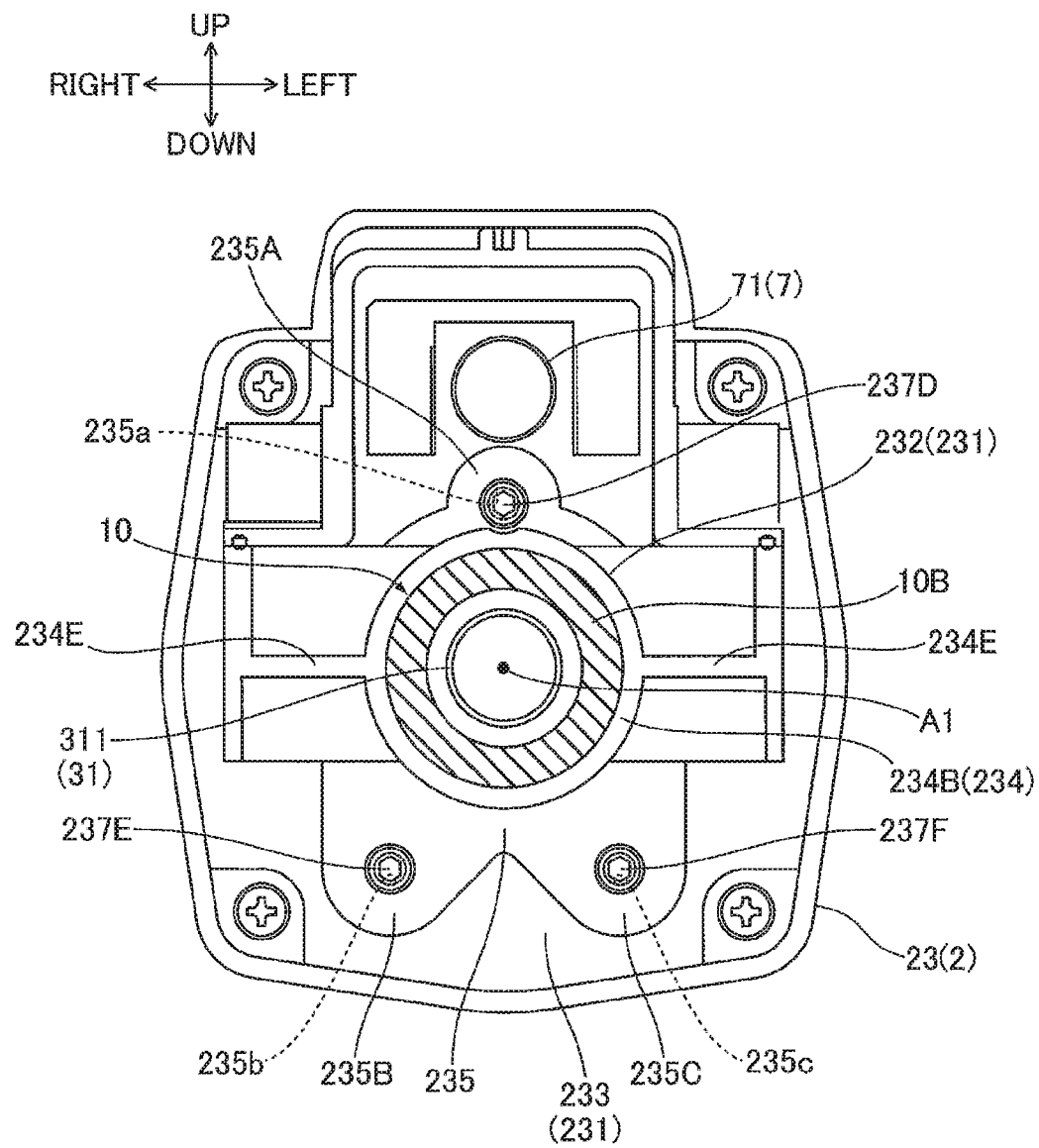
FIG. 5 is a cross-sectional view taken along the line A-A in FIG. 2, and illustrating the front bearing support portion and an elastic body of the shock absorbing portion in the saber saw according to the embodiment.

As illustrated in FIGS. 4 and 5, the front bearing support portion 232 supports the front bearing 9 such that the front bearing 9 is movable in the front-rear direction. The front bearing support portion 232 also supports the shock absorbing portion 10. The front bearing support portion 232 includes a sleeve wall 234, a first wall 235, a connecting wall 236, a fixed plate 237, and a second wall 238.

The sleeve wall 234 has a generally hollow cylindrical shape extending in the front-rear direction. As illustrated in FIG. 5, the sleeve wall 234 is supported by two ribs 234E extending in the left-right direction. The sleeve wall 234 includes a thick wall portion 234A and a thin wall portion 234B.

As illustrated in FIG. 4, the thick wall portion 234A constitutes the front portion of the sleeve wall 234. The thick wall portion 234A is formed with a groove 234*a*. The groove 234*a* is recessed outwardly in the radial direction from an inner peripheral surface 234C of the thick wall portion 234A, and extends over the entirety thereof in the circumferential direction. An O ring 234D is fitted in the groove 234*a*. The thin wall portion 234B constitutes the rear portion of the sleeve wall 234. The inner diameter of the thin wall portion 234B is greater than the inner diameter of the thick wall portion 234A.

The first wall 235 extends outwardly in the radial direction from the rear end portion of the sleeve wall 234 (i.e., the rear end portion of the thin wall portion 234B). As illustrated in FIG. 5, the first wall 235 includes a first protruding portion 235A protruding upward, a second protruding portion 235B protruding diagonally rightward and downward, and a third protruding portion 235C protruding diagonally leftward and downward. The first protruding portion 235A, the second protruding portion 235B, and the third protruding portion 235C are formed with a first thread hole 235*a*, a second thread hole 235*b*, and a third thread hole 235*c*, respectively.

As illustrated in FIG. 4, the connecting wall 236 extends rearward from the peripheral end portion of the first wall 235, and connects the first wall 235 and the facing wall 233.

The fixed plate 237 is fixed to the rear surface of the first wall 235, and includes an annular portion 237A, a first fixed portion 237B, a second fixed portion (not illustrated), and a third fixed portion 237C.

The annular portion 237A has an annular shape in a rear view. The inner peripheral surface of the annular portion 237A is positioned more inward in the radial direction than the inner peripheral surface of the thin wall portion 234B.

The first fixed portion 237B protrudes upward from the upper portion of the annular portion 237A, and is fixed to the rear surface of the first protruding portion 235A of the first wall 235 by a first bolt 237D extending through the first thread hole 235*a*.

The second fixed portion (not illustrated) protrudes diagonally rightward and downward from the right lower portion of the annular portion 237A, and is fixed to the rear surface of the second protruding portion 235B of the first wall 235 by a second bolt 237E extending through the second thread hole 235*b*.

The third fixed portion 237C protrudes diagonally leftward and downward from the left lower portion of the annular portion 237A, and is fixed to the rear surface of the third protruding portion 235C of the first wall 235 by a third bolt 237F extending through the third thread hole 235*c*.

The second wall 238 protrudes inwardly in the radial direction from the front end portion of the sleeve wall 234 (i.e., the front end portion of the thick wall portion 234A), and has an annular shape in a rear view.

The front bearing 9 is a ball bearing including an outer race 91 and an inner race 92, which are rotatable relative to each other. The front bearing 9 is force-fitted in the thick wall portion 234A (i.e., the sleeve wall 234) through the O ring 234D, and a minute gap is provided between the inner peripheral surface 234C of the thick wall portion 234A and an outer peripheral surface 91A of the outer race 91. Hence, the front bearing 9 is movable relative to the front bearing support portion 232 in the front-rear direction. The front end portion of the rotation shaft 311 is force-fitted in and fixed to the inner race 92 of the front bearing 9, and accordingly, the rotation shaft 311 (i.e., the rotation shaft portion 31), the front bearing 9, and the rear bearing 8 move integrally with one another in the front-rear direction. The front bearing 9 is an example of a "bearing" in the present invention.

The shock absorbing portion 10 is a mechanism configured to, when impact is applied to the power transmission portion 6 and the rotation shaft portion 31, mitigate the applied impact. The shock absorbing portion 10 and the front bearing 9 are disposed so as to be arrayed in the front-rear direction (i.e., the axial direction). The shock absorbing portion 10 includes an annular plate 10A and an elastic body 10B. Mitigation of impact by the shock absorbing portion 10 will be described later.

The annular plate 10A is a plate member made of metal and has an annular shape in a front view, and has a predetermined thickness in the front-rear direction. The annular plate 10A is interposed between the elastic body 10B and the front bearing 9 in the front-rear direction. The inner diameter of the annular plate 10A is greater than the outer diameter of the inner race 92 of the front bearing 9, and is smaller than the inner diameter of the outer race 91. In other words, the inner peripheral surface of the annular plate 10A is positioned more outward in the radial direction than the outer peripheral surface of the inner race 92, and is positioned more inward in the radial direction than the inner peripheral surface of the outer race 91. Hence, the annular plate 10A is in contact with the outer race 91 of the front bearing 9, but is in separation from the inner race 92. Therefore, the annular plate 10 is not a hindrance to relative rotation of the inner race 92 to the outer race 91, and accordingly, smooth relative rotation of the inner race 92 to the outer race 91 can be secured. The annular plate 10 is an example of a "plate" in the present invention.

The elastic body 10B is a rubber member elastically deformable, and has a generally hollow cylindrical shape extending in the front-rear direction, as illustrated in FIGS. 4 and 5. The elastic body 10B is interposed between the annular plate 10A and the annular portion 237A of the fixed plate 237 in a state where the elastic body 10B is slightly compressed in the front-rear direction. As illustrated in FIG. 4, the front end portion of the elastic body 10B is in contact with the rear surface of the annular plate 10A, and the rear end portion of the elastic body 10B is in contact with the front surface of the annular portion 237A.

The elastic body 10B urges the annular plate 10A toward the outer race 91 of the front bearing 9. In other words, the elastic body 10B urges the annular plate 10A, the front bearing 9, and the rotation shaft portion 31 frontward. Hence, in a case where a force (i.e., a rearward force) for moving the rotation shaft portion 31 rearward (in a direction away from the power transmission gear 61) against the urging force of the elastic body 10B is not imparted on the rotation shaft portion 31 or in a case where the rearward force imparted on the rotation shaft portion 31 is small, the outer race 91 of the front bearing 9 is maintained at a state where the outer race 91 is in contact with the rear surface of the second wall 238 (i.e., at the state illustrated in FIGS. 4 and 6). On the other hand, in a case where a large rearward force is imparted on the rotation shaft portion 31, the rotation shaft portion 31, the rear bearing 8, and the front bearing 9 are integrally moved rearward while compressing the elastic body OB rearward. As a result, the outer race 91 of the front bearing 9 is moved away from the second wall 238.

Further, as viewed in the up-down direction, the elastic body 10B overlaps with the shaft 71 in a state where the shaft 71 is positioned at the rear dead center. Therefore, additional layout space for disposing the elastic body 10B in the housing 2 is unnecessary. Thus, the elastic body 10B can be provided in the housing 2 without increase in the dimension in the front-rear direction of the saber saw 1.

Next, operation in the saber saw 1 will be described. Typically, for performing cutting work with the saber saw 1, the operator attaches the blade B to the blade attachment portion 72, and then, he grips the grip portion 211 with his one hand and grips the front portion (i.e., the small diameter portion) of the gear case 23 with another hand. In this state, the operator performs an operation of pulling the trigger switch 211B with a finger of the hand gripping the grip portion 211, so that the controller starts to drive the brushless motor 3 and thus the rotation shaft portion 31 and the rotor 32 start to integrally rotate about the rotation axis A1.

Upon the start of rotation of the rotation shaft portion 31, the rotation of the rotation shaft portion 31 rotates the power transmission gear 61 that is in meshing engagement with the pinion gear 312, so that the pin 62 revolves around the rotation axis A2 of the power transmission gear 61. Only the motion component in the front-rear direction in the revolving motion is transmitted to the driven portion 7 though the pin guide 63, so that the pin guide 63, the driven portion 7, and the blade B are integrally reciprocally moved in the front-rear direction. Thus, the workpiece can be cut by the reciprocating blade B.

Incidentally, the saber saw 1 according to the present embodiment includes a so-called orbital mechanism (a swing mechanism) configured to cause the shaft 71 to swing in the up-down direction during reciprocating movement of the shaft 71. The orbital mechanism includes a pressure slope surface 61a, a bearing 71a, an urging member 7b, and a swing shaft 7c.

The pressure slope surface 61a has an annular shape in a plan view and constitutes the upper surface of an annular wall that is provided on the upper surface of the power transmission gear 61 so as to rotate integrally with the power transmission gear 61. The annular wall has an annular shape in a plan view centered on the rotation axis A2 and protrudes upward. The height (the dimension in the up-down dimension) of the annular wall is continuously changed in the circumferential direction of the rotation axis A2 of the power transmission gear 61. Thus, the pressure slope surface 61a is sloped such that the height of the pressure slope surface 61a is continuously changed in the circumferential direction of the rotation axis A2.

The bearing 71a is a ball bearing having an annular shape a in front view, and is fixed to an outer peripheral surface of the rear portion of the sleeve portion 7a. The bearing 71a is positioned rearward of the pin guide 63 in a state where the shaft 71 is positioned at the rear dead center. The bearing 71a is engaged with the pressure slope surface 61a. The height of the portion of the pressure slope surface 61a which portion is in engagement with the bearing 71a is the highest in a state where the shaft 71 is at the rearmost position (i.e., the rear dead center), and is the lowest in a state where the shaft 71 is at the frontmost position (i.e., the front dead center). Hence, in the state illustrated in FIG. 1, the rear end portion of the pressure slope surface 61a is the lowest and the front end portion of the pressure slope surface 61a is the highest.

The urging member 7b is a spring extending in the up-down direction, and is provided rearward of the bearing 71a. The urging member 7b presses the rear end portion of the sleeve portion 7a downward, so that an urging force directed downward is always imparted on the rear end portion of the sleeve portion 7a.

The swing shaft 7c extends in the left-right direction, and is provided at the front lower portion of the sleeve portion 7a. The swing shaft 7c swingably supports the sleeve portion 7a, so that the sleeve portion 7a is swingable about the swing shaft 7c.

When the power transmission gear 61 rotates from the state illustrated in FIG. 1, the pressure slope surface 61a rotates integrally with the power transmission gear 61. By the rotation of the pressure slope surface 61a, the height of the portion of the pressure slope surface 61a which portion is in engagement with the bearing 71a gradually and continuously increases. As a result, an urging force directed upward (i.e., a force for moving the bearing 71a upward) is applied to the bearing 71a, and at the same time, the urging force directed upward (i.e., a force for moving upward the portion of the sleeve portion 7a to which the bearing 71a is fixed) is applied through the bearing 71a also to the portion of the sleeve portion 7a to which the bearing 71a is fixed. This urging force causes the sleeve portion 7a to swing about the swing shaft 7c against the urging force of the urging member 7b such that the rear end of the sleeve portion 7a moves upward. In accordance with further rotation of the power transmission gear 61, the shaft 71 moves to the frontmost position (the front dead center), and thus the portion of the pressure slope surface 61a which is in engagement with the bearing 71a becomes the highest (that is, the bearing 71a is engaged with the highest portion of the pressure slope surface 61a).

In accordance with further rotation of the power transmission gear 61, the height of the portion of the pressure slope surface 61a which portion is in engagement with the bearing 71a is gradually lowered, so that the position of the bearing 71a is moved downward, and hence, the sleeve portion 7a swings about the swing shaft 7c such that the rear end of the sleeve portion 7a is moved downward.

In this way, the angle of the inclination of the shaft 71 is changed through the sleeve portion 7a according to the position in the front-rear direction of the shaft 71, thereby enhancing cutting performance. Incidentally, in the saber saw 1, for the purpose of attaining the orbital mechanism, the sleeve portion 7a is extended to a position rearward of the pin guide 63 in a state where the shaft 71 is at the rearmost position (i.e., the rear dead center) in order for the sleeve portion 7a to have both a portion to which the bearing 71a is to be fixed and a portion to which the urging force of the urging member 7b is to be applied.

Figure 6:
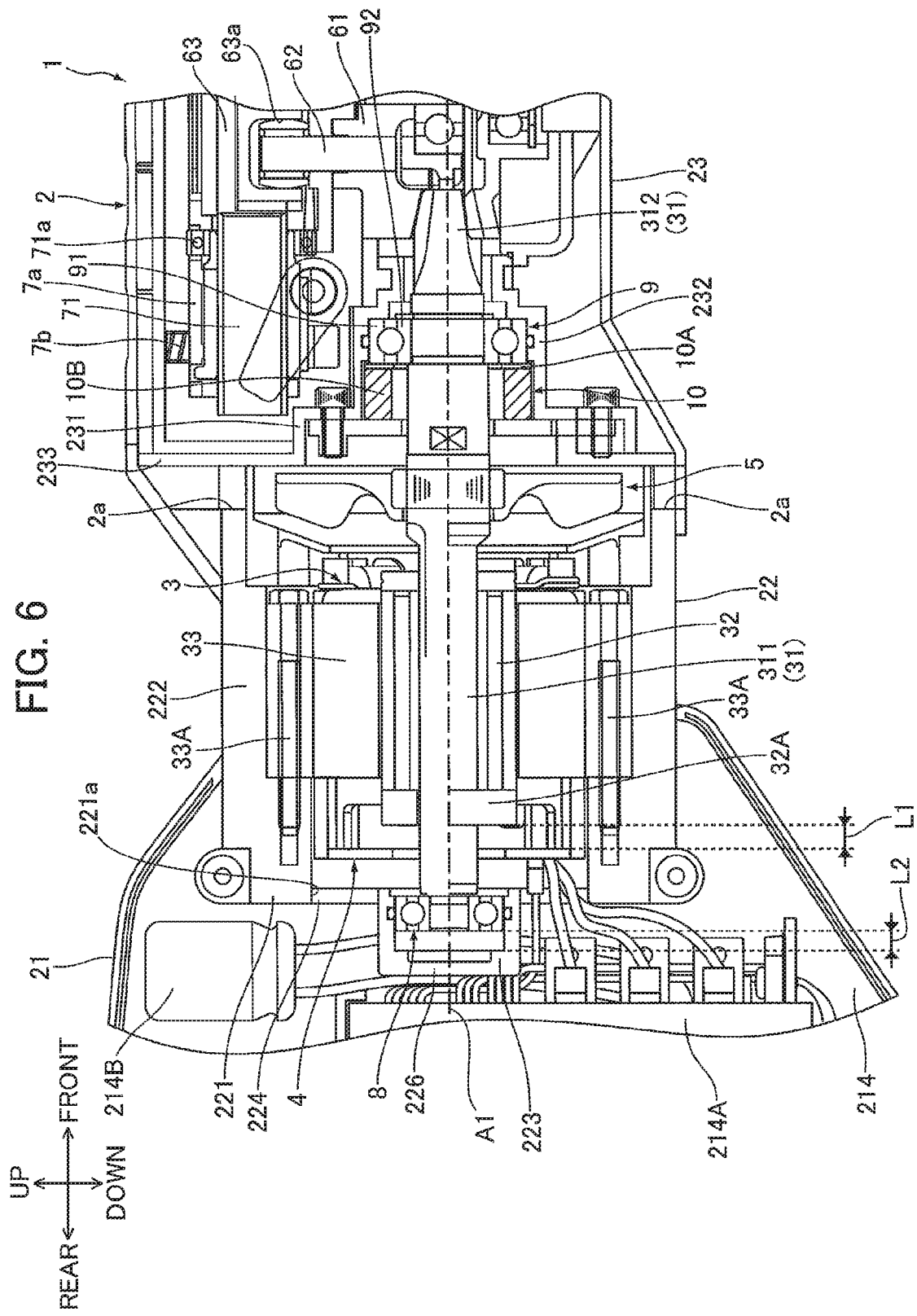
FIG. 6 is a partial cross-sectional view illustrating the internal structure of the saber saw according to the embodiment, and particularly illustrating a state where smooth cutting work is being performed.

Next, impact mitigation by the shock absorbing portion 10 in case of application of an impact to the power transmission portion 6 and the rotation shaft portion 31 will be described with reference to FIGS. 6 and 7. In the following description, a case where the driven portion 7 (i.e., the shaft 71) is locked due to the blade B getting stuck in the workpiece during a cutting work will be described as an example of cases where an impact is imparted on the power transmission portion 6 and the rotation shaft portion 31. Incidentally, as illustrated in FIG. 6, in a state where a cutting work is being smoothly performed (i.e., in a state of no occurrence of locking of the driven portion 7), the contact of the outer race 91 of the front bearing 9 with the rear surface of the second wall 238 is maintained by virtue of the urging force of the elastic body 10B although a thrust force directed rearward is slightly applied to the rotation shaft portion 31.

When the driven portion 7 is locked (that is, at the moment of the occurrence of locking of the driven portion 7) due to the blade B getting stuck in the workpiece during a cutting work, the driven portion 7 having been reciprocally moving is suddenly stopped. As a result, reciprocating movement of the pin guide 63, revolving movement of the pin 62, and rotation of the power transmission gear 61 are also suddenly stopped. On the other hand, the pinion gear 312 in meshing engagement with the power transmission gear 61 tries to continue rotating (i.e., the rotation shaft portion 31 tries to continue rotating) because the brushless motor 3 continues to be driven. Accordingly, at the time of the occurrence of the locking of the driven portion 7, an impact is applied to the pin guide 63, the pin 62, teeth of the power transmission gear 61, teeth of the pinion gear 312, and other parts, and also, the rearward thrust force applied to the rotation shaft portion 31 becomes extremely large.

However, when the rearward thrust force applied to the rotation shaft portion 31 becomes extremely large, the rotation shaft portion 31, the rear bearing 8, the front bearing 9, the rotor 32, and the sensor magnet 32A are integrally moved rearward, and at the same time, the elastic body 10B is compressed rearward as illustrated in FIG. 7. Therefore, the impact force applied to the rotation shaft portion 31 (mainly, the teeth of the pinion gear 312), the power transmission gear 61 (mainly, the teeth of the power transmission gear 61), the pin 62, and the pin guide 63 can be mitigated at the time of the occurrence of the locking of the driven portion 7. With this configuration, the durability of both the rotation shaft portion 31 and the power transmission portion 6 against the impact can be improved, and breakage and deformation of the rotation shaft portion 31, the power transmission gear 61, the pin 62, and the pin guide 63 can be suppressed. Incidentally, although the elastic body 10B expands in the up-down direction at the time of the compression as illustrated in FIG. 7, the expanded elastic body 10B can be prevented from contacting with the inner race 92 of the front bearing 9 since the annular plate 10A having a predetermined thickness in the front-rear direction is provided between the elastic body 10B and the front bearing 9. Therefore, smooth rotation of the inner race 92 relative to the outer race 91 can be ensured even during compression of the elastic body 10B. Incidentally, the thickness of the annular plate 10A is approximately 2 mm. However, the thickness of the annular plate 10A is not limited as long as the thickness can provide a strength that can sufficiently withstand a pressure for compressing the elastic body 10B, and further, the thickness can prevent the expanded elastic body 10B from contacting with the inner race 92 of the front bearing 9.

Further, at the time of compression of the elastic body 10B, the sensor magnet 32A moves rearward integrally with the rotation shaft portion 31 to approach the sensor board 4. However, the elastic modulus of the elastic body 10B is designed so that a gap distance L1 in the front-rear direction between the sensor magnet 32A and the sensor board 4 will be 2 mm or more at the time that the elastic body OB is compressed. Therefore, the sensor magnet 32A (a part of the rotor 32) can be prevented from coming into collision against the sensor board 4 at the time of compression of the elastic body 10B (at the time of occurrence of locking of the driven portion 7), thereby preventing the three Hall elements from being damaged. Incidentally, according to the present embodiment, the gap distance L1 in the front-rear direction between the sensor magnet 32A and the sensor board 4 in the state illustrated in FIG. 6 is designed to be approximately 3 mm, and the rotation shaft portion 31 is moved rearward by approximately 1 mm at the time of the occurrence of locking of the driven portion 7 (at the time of compression of the elastic body 10B). Further, a gap distance L2 in the front-rear direction between the rear bearing 8 and the front surface of the rear end wall 226 in the state illustrated in FIG. 6 is designed to be approximately 2 mm, which is greater than the distance (approximately 1 mm) by which the rotation shaft portion 31 is moved rearward at the time of compression of the elastic body 10B.

As described above, the saber saw 1 according to the present embodiment of the present invention includes the brushless motor 3 having a rotation shaft portion 31 rotatable about the rotation axis A1, the housing 2 accommodating therein the brushless motor 3, the power transmission portion 6 configured to receive the rotation force of the rotation shaft portion 31 and to transmit a driving force based on the rotation force, and the driven portion 7 configured to be driven by receiving the transmitted driving force. Also, the rotation shaft portion 31 is supported by the housing 2 so as to be movable relative to the housing 2 in the axial direction of the rotation axis A1.

With the above structure, an impact applied to the rotation shaft portion 31 and the power transmission portion 6 can be mitigated by the movement in the axial direction (rearward in the present embodiment) of the rotation shaft portion 31. Accordingly, the rotation shaft portion 31 and the components (that is, the power transmission gear 61, the pin 62, and the pin guide 63) constituting the power transmission portion 6 can have improved durability against the impact, and thus the rotation shaft portion 31 and the components constituting the power transmission portion 6 can be suppressed from being deformed and damaged. Further, according to the above-described structure, the improvement on the durability of both the rotation shaft portion 31 and the components constituting the power transmission portion 6 against the impact can be achieved at low cost and with a compact structure, in comparison with a structure in which a clutch mechanism or the like for mitigating the impact applied to the rotation shaft portion 31 and the power transmission portion 6 is provided on the power transmission path.

Further, the saber saw 1 further includes the shock absorbing portion 10 including the elastic body 10B configured to be elastically deformed (compression in the present embodiment) by the movement of the rotation shaft portion 31 in the axial direction. With this structure, the impact applied to the rotation shaft portion 31 and the power transmission portion 6 can further be effectively mitigated by virtue of the elastic deformation (compression) of the elastic body 10B.

Further, the saber saw 1 further includes the front bearing 9 supporting the rotation shaft portion 31 such that the rotation shaft portion 31 is rotatable about the rotation axis A1. the front bearing 9 is supported by the housing 2 so as to be movable integrally with the rotation shaft portion 31 in the axial direction. The shock absorbing portion 10 and the front bearing 9 are arrayed in the axial direction and the shock absorbing portion 10 is in contact with the front bearing 9. This structure can effectively mitigate the impact applied to the rotation shaft portion 31 and the power transmission portion 6.

Further, the shock absorbing portion 10 of the saber saw 1 further includes the annular plate 10A interposed between the front bearing 9 and the elastic body 10B. The front bearing 9 includes the outer race 91 and the inner race 92 which are rotatable relative to each other. Further. The rotation shaft portion 31 is fixed to the inner race 92, and the elastic body 10B urges the annular plate 10A toward the outer race 91. The annular plate 10A is in contact with the outer race 91 and is away from the inner race 92.

With this structure, since the annular plate 10A is provided between the elastic body 10B and the front bearing 9, the elastic body 10B expanded at the time of compression never contacts with the inner race 92 of the front bearing 9. Hence, smooth relative rotation between the inner race 92 and the outer race 91 can be ensured even during the compression of the elastic body 10B.

Further, the saber saw 1 according to the embodiment further includes a rear bearing 8 supported by the housing 2 and supporting, in cooperation with the front bearing 9, the rotation shaft portion 31 such that the rotation shaft portion 31 is rotatable about the rotation axis A1. The elastic body 10B is positioned between the front bearing 9 and the rear bearing 8 in the axial direction. With this structure, a space between conventional two bearings used to support a rotation shaft portion can be utilized to dispose the elastic body 10B therein, whereby the saber saw 1 can be suppressed from being increased in size. Further, in the saber saw 1 according to the embodiment, for the purpose of attaining the orbital mechanism, the sleeve portion 7a is extended to a position rearward of the pin guide 63 in a state where the shaft 71 is at the rearmost position in the reciprocating movement of the shaft 71. With this structure, a dead space is provided at the region within the housing 2 which is downward of the rear end portion of the sleeve portion 7a and rearward of the power transmission gear 61. However, according to the present embodiment, since the elastic body 10B is disposed in the space, i.e., the region overlapping with the rear end of the sleeve portion 7a in the front-rear direction (in other words, the region overlapping with the rear end of the sleeve portion 7a as viewed in a direction perpendicular to the rotation axis A1 (as viewed in the up-down direction in the embodiment)), the dead space can be efficiently utilized to avoid an increase in size of the saber saw 1.

Further, the rotation shaft portion 31 of the saber saw 1 includes the rotation shaft 311 extending in the axial direction, and the pinion gear 312 provided at the rotation shaft 311. Furthermore, the power transmission portion 6 of the saber saw 1 includes the power transmission gear 61 in meshing engagement with the pinion gear 312. The power transmission gear 61 is a bevel gear.

With this structure, the impact applied to the power transmission portion 6 can be efficiently converted into an impact applied to the rotation shaft 311 in the axial direction (i.e., into a thrust force applied to the rotation shaft 311), and the impact in the axial direction can be effectively mitigated by the movement in the axial direction of the rotation shaft 311. Accordingly, the impact applied to the rotation shaft portion 31 and the power transmission portion 6 can further be effectively mitigated.

Further, in the saber saw 1, the brushless motor 3 is employed as the drive source. Hence, the structure for mitigating the impact applied to the rotation shaft portion 31 and the power transmission portion 6 can be suitably achieved by moving the rotation shaft portion 31 in the axial direction. More specifically, assuming that a rotation shaft portion is designed to be movable in the axial direction thereof in a power tool in which a motor with brush is employed as the drive source of the power tool, contact between the brush and a commutator becomes unstable, which may disrupt driving of the motor may be disrupted. Therefore, in the above-assumed power tool, a structure in which the impact applied to the rotation shaft portion and the power transmission portion can be mitigated by moving the rotation shaft portion in the axial direction cannot be suitably attained. Accordingly, in order to attain the structure for mitigating the impact applied to the rotation shaft portion and the power transmission portion in the power tool employing the motor with brush, that power tool has no choice but to be provide with, for example, an impact mitigating mechanism within a power transmission portion (deceleration mechanism). In contrast, in the saber saw 1 employing the brushless motor 3 in which the brush and the commutator need not be provided, even the configuration in which the rotation shaft portion is movable in the axial direction is less likely to disrupt driving of the brushless motor 3, and accordingly, there can be suitably achieved the structure in which the impact applied to the rotation shaft portion 31 and the power transmission portion 6 can be mitigated by virtue of the movement in the axial direction of the rotation shaft portion 31.

While the description has been made in detail with reference to the embodiment, it would be apparent that various modifications may be made thereto without departing from the scope of the invention defined in the claims.

In the above-described embodiment, there has been exemplified the saber saw 1 including a shaft-intersection type of a gear structure in which the pinion gear 312 provided at the rotation shaft 311 and the power transmission gear 61 in meshing engagement with the pinion gear 312 are both spiral bevel gears. However, the present invention is not limited to this but can be applied to any power tool as long as the power tool includes a gear structure in which a thrust force is imparted on the rotation shaft of the brushless motor. Incidentally, other than the gear structure of the above-described embodiment, examples of the gear structure in which a thrust force is imparted on the rotation shaft of the brushless motor includes, a shaft-intersection type of a gear structure in which a pinion gear provided at the rotation shaft and a power transmission gear in meshing engagement with the pinion gear are both straight bevel gears, and a shaft-parallel type of a gear structure in which a pinion gear provided at the rotation shaft and a power transmission gear in meshing engagement with the pinion gear are both helical gears.

Further, in the present embodiment, the rotation shaft 311 and the pinion gear 312 are provided integrally with each other. However, the configurations of the rotation shaft 311 and the pinion gear 312 are not limited as long as the rotation shaft 311 and the pinion gear 312 are integrally rotatable and integrally movable in the front-rear direction.

Further, in the present embodiment, a rubber member elastically deformable is employed as the elastic body 10B. However, any member is available as long as the member can mitigate impact applied to the rotation shaft portion 31 and the power transmission portion 6. For example, a coil spring, a leaf spring, a disc spring, an elastic body made from metal or resin, and other members are available as the elastic body 10B.

Further, in the present embodiment, the elastic body 10B is disposed rearward of the front bearing 9. However, the elastic body 10B may be disposed rearward of the rear bearing 8. Although a region where the elastic body can be disposed is limited because the communication holes 221a are formed around the rear bearing support portion 223, the rear bearing support portion 223 can provide higher impact resistance by the combination with the elastic body positioned rearward of the front bearing 9. Further, in the present embodiment, the pressure slope surface 61a of the orbital mechanism is configured to be engaged with the bearing 71a fixed to the sleeve portion 7a. However, the sleeve portion 7a may be omitted, and the shaft 71 and the pressure slope surface 61a may be configured to directly contact with each other. In this case, an increase in size of the saber saw 1 can be suppressed by disposing the elastic body 10B such that the elastic body 10B overlaps with the mar end of the shaft 71 in the front-rear direction (i.e., as viewed in a direction perpendicular to the rotation axis A1 (as viewed in the up-down direction in the present embodiment)) in a state where the shaft 71 is at the rearmost position (i.e., the rear dead center).

REFERENCE SIGNS LIST

1: saber saw, 2: housing, 3: brushless motor, 6; power transmission portion, 7: driven portion, 8: rear bearing, 9: front bearing, 10: shock absorbing portion, 10A: annular plate, 10B: elastic body, 31: rotation shaft portion, 312: pinion gear, 61: power transmission gear

The invention claimed is:

1. A power tool comprising:
a motor comprising a rotation shaft portion rotatable about a rotation axis;
a housing accommodating therein the motor;
a power transmission portion configured to receive a rotation force of the rotation shaft portion and to transmit a driving force based on the rotation force;
a driven portion configured to be driven by receiving the transmitted driving force;
a bearing rotatably supporting the rotation shaft portion; and
a shock absorbing portion comprising:
an elastic body; and
a plate interposed between the bearing and the elastic body,
wherein the rotation shaft portion is supported by the housing so as to be movable relative to the housing in an axial direction of the rotation axis,
wherein the bearing is supported by the housing so as to be movable integrally with the rotation shaft portion in the axial direction,
wherein the bearing comprises an outer race and an inner race which are rotatable relative to each other,
wherein the elastic body is configured to be elastically deformed by movement of the rotation shaft portion in the axial direction,
wherein the rotation shaft portion is fixed to the inner race,
wherein the elastic body urges the plate toward the outer race, and
wherein the plate is in contact with the outer race and is away from the inner race.

2. The power tool according to claim 1, further comprising a second bearing supporting the rotation shaft portion in cooperation with the bearing such that the rotation shaft portion is rotatable about the rotation axis, the second bearing being supported by the housing, and
wherein the elastic body is positioned between the bearing and the second bearing in the axial direction.

3. The power tool according to claim 1, wherein the rotation shaft portion comprises:
a rotation shaft extending in the axial direction; and
a gear provided at the rotation shaft,
wherein the power transmission portion comprises a bevel gear in meshing engagement with the gear.

4. The power tool according to claim 3, further comprising a shaft reciprocally movable in a front-rear direction by the bevel gear;
wherein the elastic body is disposed at a position overlapping with a rear end of the shaft in the front-rear direction when the shaft is at a rearmost position.

5. The power tool according to claim 4, further comprising an orbital mechanism configured to change inclination of the shaft according to a position in the front-rear direction of the shaft,
wherein the orbital mechanism comprises a sleeve portion supporting the shaft such that the shaft is slidably movable.

6. The power tool according to claim 5, wherein the elastic body is disposed at a position overlapping with a rear end of the sleeve portion in a frontward/rearward direction.

7. The power tool according to claim 1, wherein the motor is a brushless motor.

8. A power tool comprising:
a motor comprising a rotation shaft portion rotatable about a rotation axis;
a housing accommodating therein the motor;
a power transmission portion configured to receive a rotation force of the rotation shaft portion and to transmit a driving force based on the rotation force;
a shaft configured to receive the transmitted driving force to reciprocally move in a front-rear direction; and
a shock absorbing portion comprising an elastic body,
wherein the rotation shaft portion is supported by the housing so as to be movable relative to the housing in an axial direction of the rotation axis,
wherein the elastic body is configured to be elastically deformed by movement of the rotation shaft portion in the axial direction, and
wherein the elastic body is disposed at a position overlapping with a rear end of the shaft in the front-rear direction when the shaft is at a rearmost position.

9. The power tool according to claim 8, further comprising an orbital mechanism configured to change inclination of the shaft according to a position in a front-rear direction of the shaft,
wherein the orbital mechanism comprises a sleeve portion supporting the shaft such that the shaft slidably movable.

10. The power tool according to claim 9, wherein the elastic body is disposed at a position overlapping with a rear end of the sleeve portion in a frontward/rearward direction.

* * * * *